United States Patent
Wagner (10) Patent No.: US 9,746,081 B2
(45) Date of Patent: Aug. 29, 2017

(54) LOW LOAD OFFSET SEAL

(75) Inventor: John B. Wagner, Greenfield, IN (US)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 780 days.

(21) Appl. No.: 12/861,892

(22) Filed: Aug. 24, 2010

(65) Prior Publication Data

US 2011/0049815 A1    Mar. 3, 2011

Related U.S. Application Data

(60) Provisional application No. 61/236,640, filed on Aug. 25, 2009.

(51) Int. Cl.
*F16J 15/3224*    (2016.01)

(52) U.S. Cl.
CPC ................ *F16J 15/3224* (2013.01)

(58) Field of Classification Search
CPC ............ F16J 15/3276; F16J 15/3224
USPC ....... 277/551, 554, 562, 569, 572, 577, 573, 277/574
See application file for complete search history.

(56) References Cited

U.S. PATENT DOCUMENTS

| | | | |
|---|---|---|---|
| 2,797,944 A | | 7/1957 | Riesing |
| RE24,940 E | * | 2/1961 | Stephens .............. F16J 15/3264 277/402 |
| 3,346,265 A | * | 10/1967 | Rhoads ................ F16J 15/3248 277/554 |
| 3,790,238 A | * | 2/1974 | Otto .................... F16C 33/7813 384/486 |
| 4,575,104 A | * | 3/1986 | Nagasawa et al. ........... 277/551 |
| 4,579,352 A | * | 4/1986 | Adang ................ F16J 15/3204 277/573 |
| 4,747,605 A | * | 5/1988 | Antonini .............. F16J 15/3216 277/558 |
| 4,755,115 A | * | 7/1988 | Akaike ......................... 418/104 |
| 5,015,001 A | * | 5/1991 | Jay ................................. 277/551 |
| 5,143,381 A | * | 9/1992 | Temple ................ F16L 21/035 277/314 |

(Continued)

FOREIGN PATENT DOCUMENTS

CN      101198810 A      6/2008

OTHER PUBLICATIONS

Handbook of Mechanical Design, New Edition, Second Volumne (41 pages).

(Continued)

*Primary Examiner* — Kristina Fulton
*Assistant Examiner* — L. Susmitha Koneru
(74) *Attorney, Agent, or Firm* — Daniel J. Sepanik, Esq.; Harness, Dickey & Pierce, P.L.C.

(57) ABSTRACT

A seal is provided for insertion in a bore in an outer member and engaging an inner member received in the bore. The seal includes an outer annular insert having a first diameter and an inner annular insert having a second diameter smaller than the first diameter. An elastomeric body includes an outer portion over-molded on the outer annular insert and an inner seal over-molded on the inner annular insert and including an intermediate web extending between the outer portion and the inner portion. The web extends both axially and radially relative to a center axis of the outer annular insert. The inner seal includes an inboard sealing surface and the outer portion including an outboard sealing surface.

10 Claims, 5 Drawing Sheets

(56) References Cited

U.S. PATENT DOCUMENTS

| | | | | |
|---|---|---|---|---|
| 5,169,161 | A * | 12/1992 | Jones | F16J 15/025 |
| | | | | 277/615 |
| 5,183,271 | A * | 2/1993 | Wada | F16J 15/328 |
| | | | | 277/351 |
| 5,244,215 | A * | 9/1993 | Cather et al. | 277/309 |
| 5,269,536 | A * | 12/1993 | Matsushima et al. | 277/349 |
| 5,269,539 | A * | 12/1993 | Martin | 277/569 |
| 5,484,260 | A * | 1/1996 | Brandon | 415/134 |
| 5,501,469 | A * | 3/1996 | Ducugnon et al. | 277/551 |
| 5,522,600 | A * | 6/1996 | Duckwall | 277/402 |
| 5,687,972 | A * | 11/1997 | Petrak | F16J 15/3256 |
| | | | | 277/349 |
| 5,820,132 | A * | 10/1998 | Marnot | 277/551 |
| 5,833,245 | A * | 11/1998 | Gallagher | 277/549 |
| 5,975,538 | A * | 11/1999 | Krause et al. | 277/551 |
| 6,209,879 | B1 * | 4/2001 | Mizunoya | F16J 15/3232 |
| | | | | 277/352 |
| 6,279,914 | B1 * | 8/2001 | Yamanaka | F16J 15/3268 |
| | | | | 277/394 |
| 6,311,985 | B1 * | 11/2001 | McKeeby et al. | 277/423 |
| 6,367,811 | B1 * | 4/2002 | Hosokawa et al. | 277/560 |
| 6,513,812 | B1 * | 2/2003 | Yang | F16J 15/3264 |
| | | | | 277/351 |
| 7,017,913 | B2 * | 3/2006 | Klenk | F16J 15/3264 |
| | | | | 277/317 |
| 7,025,357 | B2 * | 4/2006 | Spain | F16J 15/3216 |
| | | | | 277/549 |
| 7,131,648 | B2 * | 11/2006 | Peterson et al. | 277/553 |
| 7,314,219 | B1 * | 1/2008 | Horvath et al. | 277/551 |
| 7,344,140 | B2 * | 3/2008 | Ikeda | F16J 15/3228 |
| | | | | 277/551 |
| 7,464,942 | B2 * | 12/2008 | Madigan | F16J 15/3252 |
| | | | | 277/569 |
| 7,513,690 | B2 * | 4/2009 | Yamamoto | F16C 33/74 |
| | | | | 277/553 |
| 7,651,102 | B2 * | 1/2010 | Heldmann et al. | 277/551 |
| 7,677,577 | B2 * | 3/2010 | Kanzaki | F16J 3/041 |
| | | | | 277/551 |
| 7,748,907 | B2 * | 7/2010 | Yamamoto | F16C 33/74 |
| | | | | 277/553 |
| 7,753,376 | B2 * | 7/2010 | Kondo et al. | 277/353 |
| 7,891,670 | B2 * | 2/2011 | Alajbegovic | F16J 15/3244 |
| | | | | 277/549 |
| 7,946,592 | B2 * | 5/2011 | Yamamoto | F16J 15/3224 |
| | | | | 277/572 |
| 8,028,998 | B2 * | 10/2011 | Schleker | F16J 3/041 |
| | | | | 277/551 |
| 8,210,543 | B2 * | 7/2012 | Erl | F16F 13/1454 |
| | | | | 277/585 |
| 8,366,117 | B2 * | 2/2013 | Miyake et al. | 277/577 |
| 2003/0006563 | A1 * | 1/2003 | Cater | F16J 15/324 |
| | | | | 277/549 |
| 2004/0131475 | A1 * | 7/2004 | Yokomachi | F04B 27/1036 |
| | | | | 417/269 |
| 2004/0245729 | A1 * | 12/2004 | Bock et al. | 277/569 |
| 2005/0173869 | A1 * | 8/2005 | Wagner | F16L 5/10 |
| | | | | 277/602 |
| 2006/0220323 | A1 * | 10/2006 | Frostick et al. | 277/500 |
| 2007/0057472 | A1 * | 3/2007 | Hatch | B29C 45/14614 |
| | | | | 277/569 |
| 2007/0170656 | A1 * | 7/2007 | Schleker | F16J 3/041 |
| | | | | 277/549 |
| 2007/0205562 | A1 * | 9/2007 | Chien | 277/551 |
| 2007/0257447 | A1 * | 11/2007 | Petrak | 277/551 |
| 2008/0029970 | A1 * | 2/2008 | Krausz | F16L 17/035 |
| | | | | 277/549 |
| 2008/0217865 | A1 * | 9/2008 | Sedlar | F16J 15/3224 |
| | | | | 277/572 |
| 2008/0231002 | A1 | 9/2008 | Wagner et al. | |
| 2008/0265521 | A1 * | 10/2008 | Mizuta et al. | 277/551 |
| 2011/0012313 | A1 * | 1/2011 | Lev et al. | 277/562 |
| 2011/0215536 | A1 * | 9/2011 | Itadani et al. | 277/562 |
| 2012/0169014 | A1 * | 7/2012 | Vogt et al. | 277/552 |
| 2012/0169015 | A1 * | 7/2012 | Oiyama et al. | 277/562 |
| 2012/0228829 | A1 * | 9/2012 | Sedlar | F16J 15/3244 |
| | | | | 277/309 |

OTHER PUBLICATIONS

Chinese Office Action dated Apr. 20, 2017 with English translation.

\* cited by examiner

FIG 4

LOW LOAD OFFSET SEAL

CROSS-REFERENCE TO RELATED APPLICATIONS

This application claims the benefit of U.S. Provisional Application No. 61/236,640, filed on Aug. 25, 2009. The entire disclosure of the above application is incorporated herein by reference.

FIELD

The present disclosure relates to seals and more particularly, a low load dual insert offset seal.

BACKGROUND AND SUMMARY

This section provides background information related to the present disclosure which is not necessarily prior art.

Seals are commonly used for sealing a gap disposed around an outer surface of an inner member received within a bore of an outer member, such as a fuel injector, a spark plug tube, or a shaft. Conventional seals incorporate a rubber outer dimension (OD) for engaging a bore and may have various inner dimension (ID) seal configurations for engaging a shaft or other inner member.

A seal is provided for insertion in a bore in an outer member and engaging an inner member received in the bore. The seal includes an outer annular insert having a first diameter and an inner annular insert having a second diameter smaller than the first diameter. An elastomeric body includes an outer portion over-molded on the outer annular insert and an inner seal over-molded on the inner annular insert and including an intermediate web extending between the outer portion and the inner portion. The web extends both axially and radially relative to a center axis of the outer annular insert. The inner seal includes an inboard sealing surface and the outer portion including an outboard sealing surface.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
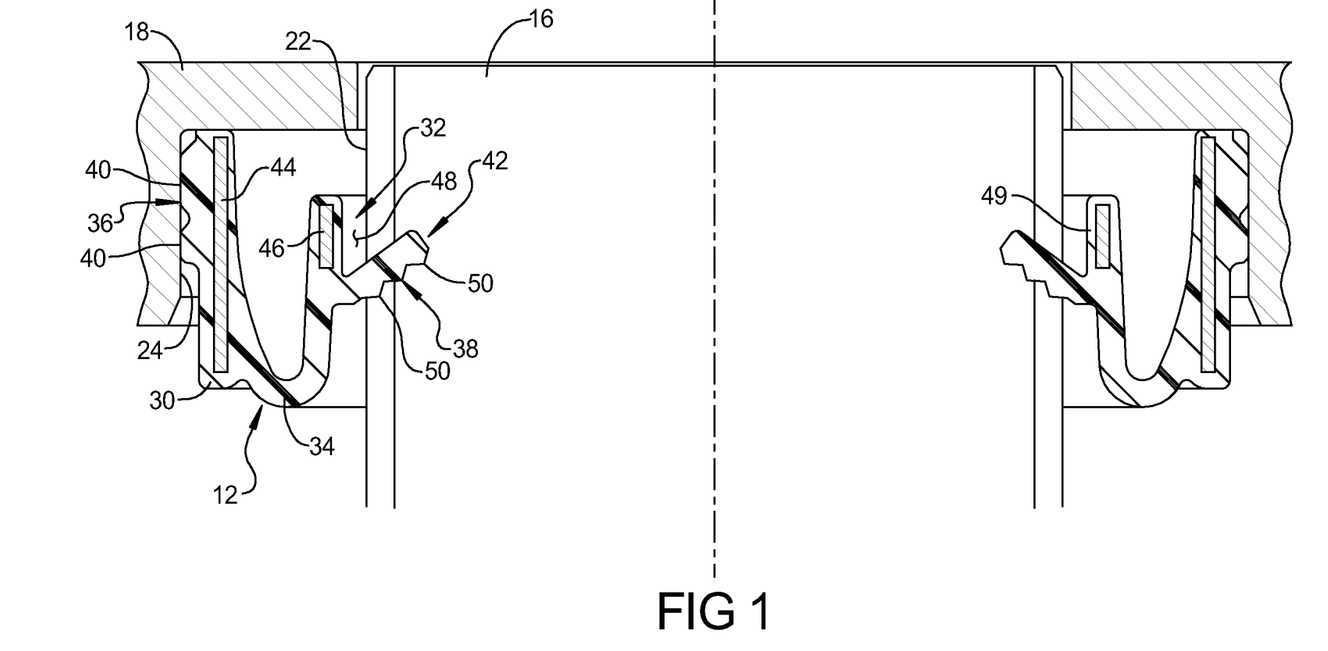
FIG. 1 is a cross-sectional view of a low load dual insert offset seal according to the principles of the present disclosure.
Figure 5A:
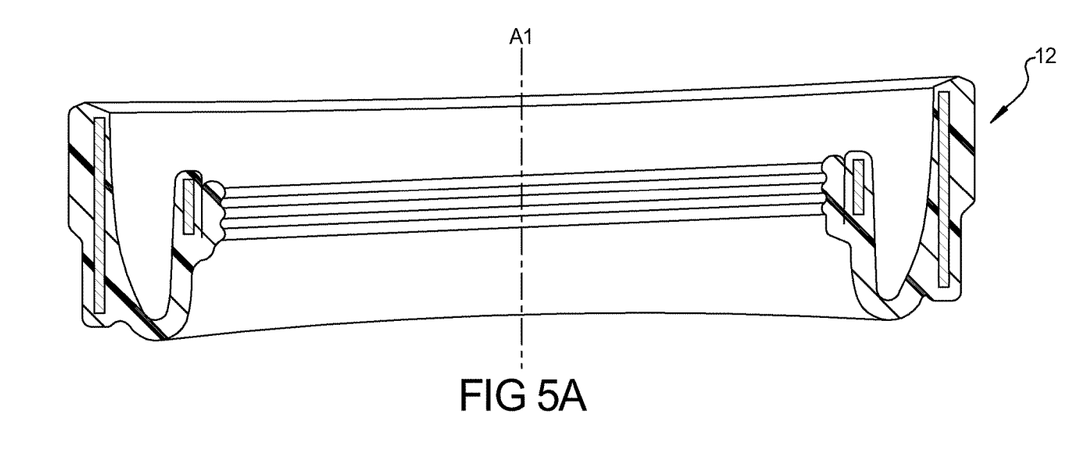
FIGS. 5A and 5B illustrate the low load offset seal of FIG. 1 with the depiction of FIG. 5B showing the seal in an offset position.
Figure 5B:
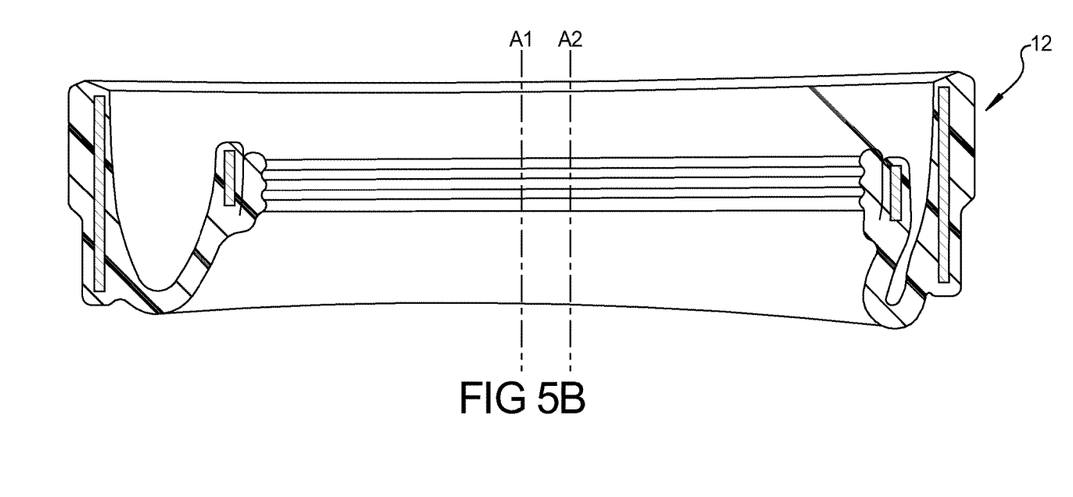

With initial reference to FIGS. 1, 5A, and 5B, an arrangement for sealing an annular space is shown. The arrangement generally includes a seal 12 disposed in an annular space defined between an inner member 16 and an outer member 18. During operation, the seal 12 engages respective sealing surfaces 22 and 24 on the inner and outer members 16 and 18, respectively, in an assembled position. For purposes of discussion, the inner member 16 will be referred to herein as a shaft, while the outer member 18 will be referred to herein as a bore. It is appreciated that while the specific examples provided herein relate to a shaft and bore arrangement, the teachings may be similarly applicable to other sealing arrangements and are not limited to a shaft and bore arrangement, as described herein.

With specific reference now to FIG. 1, the seal 12 will be described in greater detail. In general, the seal 12 includes a outer portion 30, an inner seal 32, and an intermediate web 34 extending between the outer portion 30 and the inner seal 32. The outer portion 30 is radially offset outwardly relative to the inner seal 32. The outer portion 30 defines an outboard sealing surface 36 for engaging the sealing surface 24 of the bore 18 in an installed position. Similarly, the inner seal 32 defines an inboard sealing surface 38 for engaging the sealing surface 22 of the shaft or other member 16 in an installed position. The outboard and inboard sealing surfaces 36 and 38 of the seal 12 may be made of an elastomeric material such as rubber, although other materials may be used. The outboard sealing surface 36 of the seal 12 generally defines a cylindrical face. The sealing surface 36 can include sealing beads 40 thereon in order to enhance its retention and sealing properties. The inboard sealing surface 38 of the seal 12 can be disposed on a flap 42 which will be described in greater detail herein. The web portion 34 is adapted to flex to accommodate the inner seal being radially offset relative to the outer portion 30 so that the inner seal 32 can maintain contact with the inner member 16 upon movement of the inner member 16 relative to the outer member 18.

The outer portion 30 of the seal 12 includes an outer annular insert ring 44 disposed therein. The inner seal 32 of the seal 12 includes an inner annular insert ring 46 disposed therein. The annular insert rings 44 and 46 may be of a rigid material such as metal, although other rigid materials may be used. Annular insert rings 44 and 46 provide rigidity to the respective outer portion 30 and inner seal 32 and to the seal 12 as a whole.

The flap 42 of the inner seal 32, in an uninstalled condition, can extend at an angle relative to the overmolded insert ring 46 and in an assembled position, is disposed within a gap 48 between a spring portion 49 defined by the overmolded insert ring 46 and the shaft 16. The insert ring 46 partially loads the spring portion 49 and flap 42 in the assembled position, generally illustrated in FIG. 5A. The angle and thickness of the flap 42 can vary depending on the required sealing force as well as the required loading forces for installation on the shaft 16. The geometry of the flap 42 can allow for ease of fill during the molding process and for mold removal. Furthermore, the flap 42 can include multiple seal beads 50 which can vary in shape and size. The gap 48 disposed between the spring portion 49 and the shaft 16 provides limited space for compression of the flap 42 therebetween. The flap 42 allows for reduction in the rubber stress as compared to a solid rubber bead and allows the inner seal 32 to follow the shaft 16 under a thermal cycle from hot to cold and vice versa and due to other movement such as vibration and part to part shift. This provides improved shaft follow-ability as compared to prior designs. The flap 42 lowers the elastomer strain limit of the material by creating two separate spring elements (i.e., two elastomer elements), as compared to current designs with one spring element.

With continued reference to FIGS. 1, 5A and 5B, the web portion 34 of the seal 12 extends both axially and radially relative to a center axis A1 of the outer portion 30 to accommodate lateral and angular movement of the shaft 16 relative to an axis of the bore 18 while maintaining a seal at an interface between the inboard sealing surface 38 of the seal 12 and the sealing surface 22 of the shaft 16. In FIG. 5B, the shaft 16 is shown moved from a center axis A1 laterally rightward to an offset axis A2. The inner seal 32 of the seal 12 moves complementary to movement of the shaft 16. To maintain an interface between the seal 12 and the shaft 16, the intermediate web 34 stretches on a first portion and buckles on an opposite portion. It is appreciated that the intermediate web 34 may comprise a thin web between the outer portion 30 and the inner seal 32 to accommodate further deflection and/or rotation of the shaft 16. While the seal 12 is shown deflected laterally it is appreciated that the seal 12 may experience one of lateral deflection or possibly rotation in the installed position or, alternatively, not experience any movement. The design of the present application allows greater movement or misalignment between the shaft and the bore as compared to present designs while still maintaining low installation forces. The seal 12 can be compactly designed with the inner seal 32 being disposed entirely axially between opposite ends of the outer annular insert 44.

Figure 2:
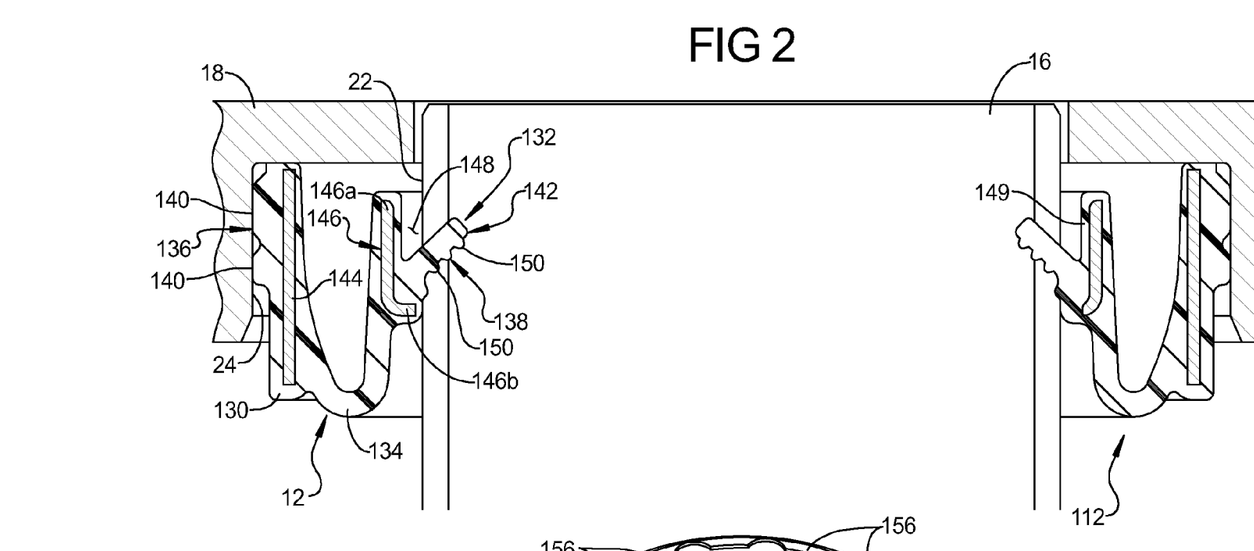
FIG. 2 is a cross-sectional view of a second embodiment low load dual insert offset seal according to the principles of the present disclosure.

With reference now to FIG. 2, an arrangement for sealing an annular space according to additional features is shown. The arrangement generally includes a seal 112 disposed in an annular space defined between an inner member 16 and an outer member 18. During operation, the seal 112 engages respective sealing surfaces 22 and 24 on the inner and outer members 16 and 18, respectively, in an assembled position.

With specific reference now to FIG. 2, the seal 112 will be described in greater detail. In general, the seal 112 includes an outer portion 130, an inner seal 132, and an intermediate web portion 134 extending between the outer portion 130 and the inner seal 132. The outer portion 130 is radially offset outwardly relative to the inner seal 132. The outer portion 130 defines an outboard sealing surface 136 for engaging the sealing surface 24 of the bore 18 in an installed position. Similarly, the inner seal 132 defines an inboard sealing surface 138 for engaging the sealing surface 22 of the shaft 16 in an installed position. The intermediate web 134 generally defines a web portion extending between the outer portion 130 and inner seal 132. The intermediate web 134, outer portion 130 and inner seal 132 are all formed of a unitary (i.e. one piece) elastomeric body, as shown in FIG. 2. The outboard and inboard sealing surfaces 136 and 138 of the seal 112 may be made of an elastomeric material such as rubber, although other materials may be used. The outboard sealing surface 136 of the seal 112 generally defines a cylindrical face. The sealing surface 136 can include sealing beads 140 thereon. The inboard sealing surface 138 of the seal 112 is disposed on a flap 142 which will be described in greater detail herein. The intermediate web 134 and inner seal 132 is adapted to deflect with the inner member 16 and maintain contact with the inner member 16 upon movement of the inner member 16 relative to the outer member 18.

The outer portion 130 of the seal 112 includes an outer annular insert ring 144 disposed therein. The inner seal 132 of the seal 112 includes a second annular insert ring 146 disposed therein. The annular rings 144 and 146 may be made of a rigid material such as metal. Annular rings 144 and 146 each have an opening there through, as shown in FIG. 2, and provide rigidity to the respective outer portion 130 and the inner seal 132 and to the seal 112 as a whole. The inner annular insert ring 146 can include an axially extending cylindrical leg 146a and a radially inwardly extending leg 146b which extends toward the shaft 16 and having an inner diameter that prevents excessive inner seal movement at extreme offset. The radially inwardly extending leg 146b can include a series of spaced tabs 156. The radially inwardly extending leg 146b can be axially spaced from the flap 142 and restricts movement of the inner seal 132 relative to the shaft 16 to prevent excessive load on the flap 142.

The flap 142 of the inner seal 132 can extend at an angle relative to the cylindrical leg 146a of the overmolded insert ring 146 and in an assembled position, is disposed within a gap 148 between a spring portion 149 defined by the overmolded cylindrical leg 146a and the shaft 16. The axially extending leg 146a partially loads the spring portion 149 and flap 142 in the assembled position. The angle of the flap 142 (illustrated in the un-assembled position in FIG. 2) can vary depending on the required sealing force as well as the required loading forces for installation on the shaft 16. The geometry of the flap 142 can allow for ease of fill during the molding process and for mold removal. Furthermore, the flap 142 can include multiple seal beads 150 which can vary in shape and size. The gap 148 disposed between the spring portion 149 and the shaft 16 provides limited space for compression of the flap 142 therebetween. The flap 142 allows for reduction in the rubber stress as compared to a solid rubber bead and allows the inner seal 132 to follow the shaft 16 under a thermal cycle from hot to cold and vice versa and due to other movements such as vibration and part to part shift. This design provides the same benefits as the design of FIG. 1 while limiting the amount of compression of the spring elements.

With continued reference to FIG. 2, the seal 112 accommodates lateral and angular movement of the shaft 16 relative to an axis of the bore 18 while maintaining a seal at an interface between the inboard sealing surface 138 of the seal 112 and the sealing surface 22 of the shaft 16. In the same manner as illustrated in FIG. 5B, the inner seal 132 of the seal 112 moves complementary to movement of the shaft 16. To maintain an interface between the seal 112 and the shaft 16, the intermediate web 134 stretches on a first portion and buckles on an opposite portion. It is appreciated that the intermediate web 134 may comprise a thin web between the outer portion 130 and the inner seal 132 to accommodate further deflection and/or possibly rotation of the shaft 16.

Figure 4:
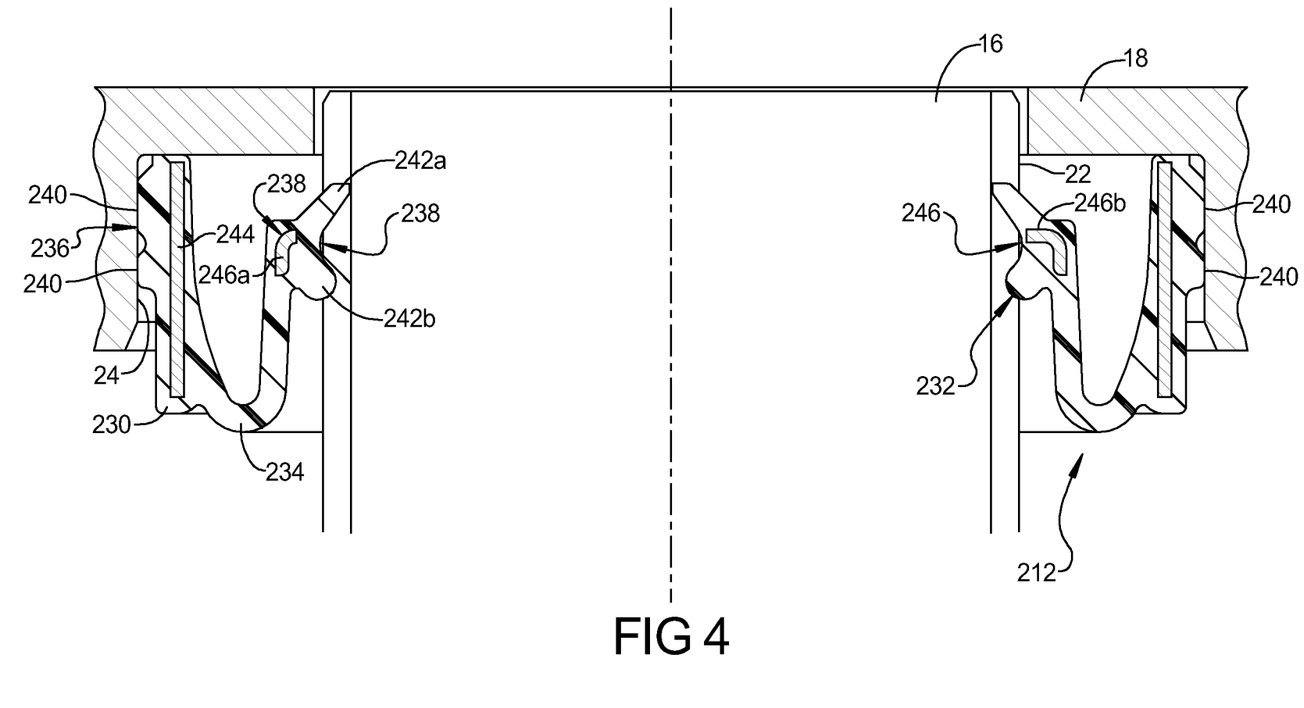
FIG. 4 is a cross-sectional view of a third embodiment of the low load offset seal according to the principles of the present disclosure.

With reference now to FIG. 4, an arrangement for sealing an annular space according to additional features is shown. The arrangement generally includes a seal 212 disposed in an annular space defined between an inner member 16 and an outer member 18. During operation, the seal 212 engages respective sealing surfaces 22 and 24 on the inner and outer members 16 and 18, respectively, in an assembled position.

With specific reference now to FIG. 4, the seal 212 will be described in greater detail. In general, the seal 212 includes an outer portion 230, an inner seal 232, and an intermediate web 234 extending between the outer portion 230 and the inner seal 232. The outer portion 230 is radially offset outwardly relative to the inner seal 232. The outer portion 230 defines an outboard sealing surface 236 for engaging the sealing surface 24 of the bore 18 in an installed position. Similarly, the inner seal 232 defines an inboard sealing surface 238 for engaging the sealing surface 22 of the shaft 16 in an installed position. The intermediate portion 234 generally defines a web extending between the outer portion 230 and inner seal 232.

The outboard and inboard sealing surfaces 236 and 238 of the seal 212 may be made of an elastomeric material such as rubber, although other materials may be used. The outboard sealing surface 236 of the seal 212 generally defines a cylindrical face. The sealing surface 236 can include sealing beads 240 thereon. The inboard sealing surface 238 of the seal 212 includes an angularly disposed seal lip 242a and a seal bead 242b. The intermediate web 234 and the inner seal 232 are adapted to deflect with the inner member 16 and maintain contact with the inner member 16 upon movement of the inner member 16 relative to the outer member 18.

Figure 3:
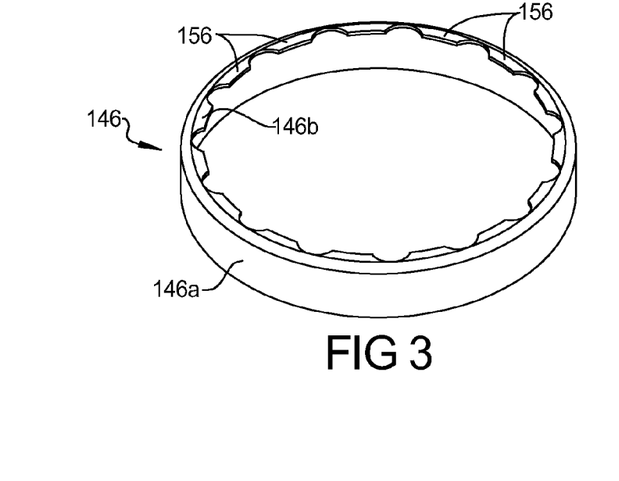
FIG. 3 is a perspective view of a support ring according to the principles of the present disclosure.

The outer portion 230 of the seal 212 includes an outer annular insert ring 244 disposed therein. The inner seal 232 of the seal 212 includes an inner annular insert ring 246 disposed therein. The annular insert rings 244 and 246 may be of a rigid material such as metal, although other rigid materials can be utilized. Annular rings 244 and 246 provide rigidity to the respective outer portion 230 and inner seal 232 and to the seal 212 as a whole. The inner annular insert ring 246 can include an axially extending cylindrical leg 246a and a radially inwardly extending leg 246b which extends toward the shaft 16 and having an inner diameter that prevents inner seal movement at extreme offset. The radially inwardly extending leg 246b can include a series of spaced tabs in the same manner as illustrated in FIG. 3. The radially inwardly extending leg 246b restricts movement of the inner seal 232 relative to the shaft 16 to prevent excessive load on the angularly disposed seal lip 242a and the seal bead 242b. The radially inwardly extending leg 246b can be disposed axially between the angularly disposed seal lip 242a and the seal bead 242b.

The angularly disposed seal lip 242a of the inner seal 232 can extend at an angle relative to the cylindrical leg 246a of the overmolded insert ring 246. The angle of the seal lip 242a can vary depending on the required sealing force as well as the required loading forces for installation on the shaft 16. The seal bead 242b can be disposed radially inward of the axially extending leg 246a of the insert ring 246 and can have a geometry to allow for ease of fill during the molding process and for mold removal. The seal bead 242b is partially loaded by the axially extending leg 246a being located radially outwardly therefrom.

Figure 6A:
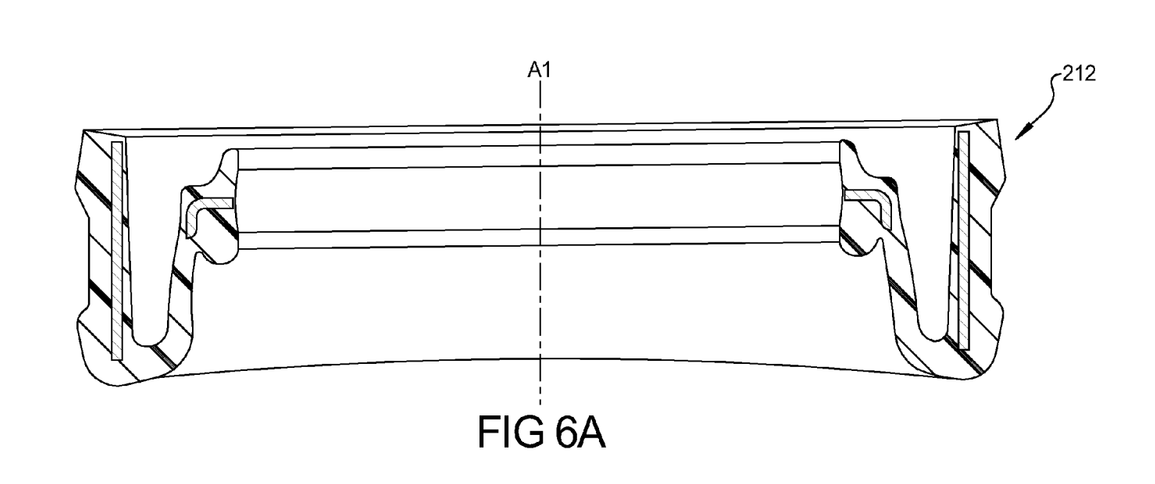
FIGS. 6A and 6B each disclose cross-sectional views of the low load offset seal shown in FIG. 4 with the FIG. 6B illustration of the seal being in an offset position.
Figure 6B:
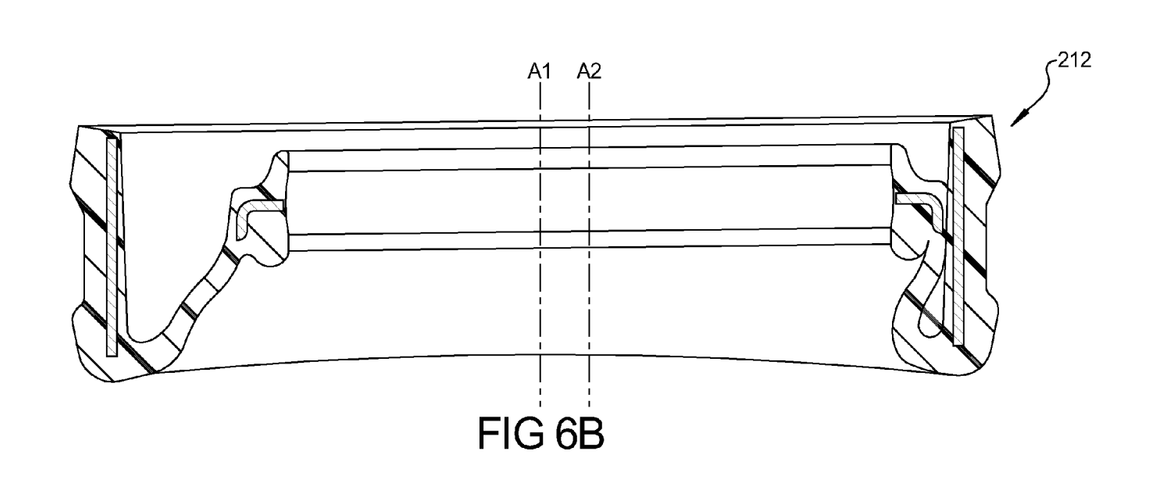

With continued reference to FIGS. 4, 6A and 6B, the seal 212 accommodates lateral and angular movement of the shaft 16 relative to an axis of the bore 18 while maintaining a seal at an interface between the inboard sealing surface 238 of the seal 212 and the sealing surface 22 of the shaft 16. As illustrated in FIG. 6B, the inner seal 232 of the seal 212 moves complementary to movement of the shaft 16. To maintain an interface between the seal 212 and the shaft 16, the intermediate web 234 stretches on a first portion and buckles on an opposite portion. It is appreciated that the intermediate web 234 may comprise a thin web between the outer portion 230 and the inner seal 232 to accommodate further deflection and/or rotation of the shaft 16. While the seal 212 is shown deflected laterally it is appreciated that the seal 212 may experience one of lateral deflection or possibly rotation in the installed position or, alternatively, not experience any movement.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A seal system, comprising:
an outer member defining a bore;
an inner member received in the bore;
an outer annular insert having a first diameter;
an inner annular insert having a second diameter smaller than said first diameter; and
a unitary elastomeric body including an outer portion over-molded on said outer annular insert and an inner portion defining a seal over-molded on said inner annular insert and including an intermediate web extending between said outer portion and said inner portion, said intermediate web extending both axially and radially relative to a center axis of said outer annular insert, said seal of said inner portion of said elastomeric body including an inboard sealing surface in direct engagement with the inner member and said outer portion of said elastomeric body including an outboard sealing surface in direct engagement with an inner surface of the bore of the outer member, wherein an annular gap is defined between said over-molded inner annular insert and said inner member, wherein said seal includes an annular flap that, in an un-installed condition, extends at an angle relative to said inner annular insert, and in an installed position, is disposed in the annular gap between the inner annular insert and the inner member, and the annular gap provides limited space so that an entire circumference of the annular flap is compressed by said inner annular insert against the inner member.

2. The seal system according to claim 1, wherein said outer portion of said elastomeric body includes at least one sealing bead extending radially outwardly therefrom.

3. The seal system according to claim 1, wherein said annular flap includes at least one bead thereon.

4. A seal system, comprising:
an outer member defining a bore;
an inner member received in the bore;
an outer annular insert having a first diameter;
an inner annular insert having a second diameter smaller than said first diameter; and
a unitary elastomeric body including an outer portion over-molded on said outer annular insert and an inner portion defining a seal over-molded on said inner annular insert and including an intermediate web extending between said outer portion and said inner portion, said intermediate web extending both axially and radially relative to a center axis of said outer annular insert, said seal of said inner portion of said elastomeric body including an inboard sealing surface in direct engagement with the inner member and said outer portion of said elastomeric body including an outboard sealing surface in direct engagement with an inner surface of the bore of the outer member, wherein an annular gap is defined between said over-molded inner annular insert and said inner member, wherein said seal includes an annular flap that, in an un-installed condition, extends at an angle relative to said inner annular insert, and in an installed position, is disposed in the annular gap between the inner annular insert and the inner member, and the annular gap provides limited space so that an entire circumference of the annular flap is compressed by said inner annular insert against the inner member, wherein said annular flap includes a hinge portion connected at a junction between said overmolded inner annular insert and said intermediate web.

5. The seal system according to claim 1, wherein said inner annular insert includes an axially extending leg and a radially inwardly extending leg extending from an end of said axially extending leg.

6. The seal system according to claim 5, wherein said radially inwardly extending leg includes a plurality of spaced tabs.

7. The seal system according to claim 1, wherein said outer annular insert includes first and second opposite ends and an entirety of said seal is disposed axially between said first and second opposite ends of said outer annular insert.

8. A seal system, comprising:
an outer member defining a bore;
an inner member received in the bore;
an outer insert surrounding an opening there through and having a first dimension;
an inner insert surrounding an opening there through and having a second dimension smaller than said first dimension; and
a unitary elastomeric body including an outer portion over-molded on said outer insert and an inner portion defining a seal over-molded on said inner insert and including an intermediate web extending between said outer portion and said inner portion, said intermediate web extending axially relative to a center axis of said outer insert, said seal of said inner portion of said elastomeric body including an inboard sealing surface in direct engagement with the inner member and said outer portion of said elastomeric body including an outboard sealing surface in direct engagement with an inner surface of the bore of the outer member, wherein an annular gap is defined between said over-molded inner annular insert and said inner member, wherein said seal includes an annular flap extending around a perimeter of the inner portion that, in an un-installed condition, extends at an angle relative to said inner insert, and in an installed position, is disposed in the annular gap between the inner annular insert and the inner member, and the annular gap provides limited space so that an entire circumference of the annular flap is compressed by said inner insert against the inner member.

9. The seal system according to claim 8, wherein said intermediate web extends radially relative to the center axis of said outer insert.

10. A seal system, comprising:
an outer member defining a bore;
an inner member received in the bore;
an outer insert surrounding an opening there through and having a first dimension;
an inner insert surrounding an opening there through and having a second dimension smaller than said first dimension; and
a unitary elastomeric body including an outer portion over-molded on said outer insert and an inner portion defining a seal over-molded on said inner insert and including an intermediate web extending between said outer portion and said inner portion, said intermediate web extending radially relative to a center axis of said outer insert, said seal of said inner portion of said elastomeric body including an inboard sealing surface in direct engagement with the inner member and said outer portion of said elastomeric body including an outboard sealing surface in direct engagement with an inner surface of the bore of the outer member, wherein an annular gap is defined between said over-molded inner annular insert and said inner member, wherein said seal includes an annular flap extending around a perimeter of the inner portion that, in an un-installed condition, extends at an angle relative to said inner insert, and in an installed position, is disposed in the gap between the inner annular insert and the inner member, and the annular gap provides limited space so that an entire circumference of the annular flap is compressed by said inner insert against the inner member.

* * * * *